(12) United States Patent
Kosaraju (10) Patent No.: US 6,826,645 B2
(45) Date of Patent: Nov. 30, 2004

(54) APPARATUS AND A METHOD TO PROVIDE HIGHER BANDWIDTH OR PROCESSING POWER ON A BUS

(75) Inventor: Chakravarthy Kosaraju, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 09/737,648

(22) Filed: Dec. 13, 2000

(65) Prior Publication Data

US 2002/0073261 A1 Jun. 13, 2002

(51) Int. Cl.⁷ ............................ G06F 13/40; G06F 3/00; G06F 13/00
(52) U.S. Cl. ............................ 710/307; 710/316; 710/8; 712/10
(58) Field of Search ................................ 710/8, 10, 11, 710/12, 14, 15, 16, 66, 104, 105, 305, 307, 316; 712/10–15

(56) References Cited

U.S. PATENT DOCUMENTS

| | | | |
|---|---|---|---|
| 5,166,674 A | 11/1992 | Baum et al. | |
| 5,386,466 A | 1/1995 | Bales et al. | |
| 5,608,446 A | 3/1997 | Carr et al. | |
| 5,828,865 A | * 10/1998 | Bell | 703/27 |
| 5,959,995 A | 9/1999 | Wicki et al. | |
| 6,061,510 A | * 5/2000 | Klein et al. | 703/25 |
| 6,148,356 A | * 11/2000 | Archer et al. | 710/307 |
| 6,151,689 A | 11/2000 | Garcia et al. | |
| 6,278,695 B1 | 8/2001 | Christensen et al. | |
| 6,321,269 B1 | * 11/2001 | Walker | 709/237 |
| 6,337,877 B1 | 1/2002 | Cole et al. | |
| 6,449,273 B1 | 9/2002 | Jennings, III | |
| 6,535,939 B1 | * 3/2003 | Arimilli et al. | 710/116 |
| 6,654,909 B1 | 11/2003 | Quach et al. | |
| 6,675,248 B1 | * 1/2004 | Olarig et al. | 710/305 |
| 6,675,266 B2 | 1/2004 | Quach et al. | |
| 2002/0133620 A1 | 9/2002 | Krause | |

FOREIGN PATENT DOCUMENTS

| | | |
|---|---|---|
| EP | 0 373 299 A2 | 6/1990 |
| US | PCT/US 01/43638 | 11/2001 |

OTHER PUBLICATIONS

M. Feridun et al., "Implementing OSI Agent/Managers for TMN", IEEE Communications Magazine, Sep. 1996, pp. 62–67.

Lakshmi Raman, ADC Telecommunications, "OSI Systems and Network Management", IEEE Communications Magazine, Mar. 1998, pp.46–53.

Hideki Murayama et al., "A Study of High–Performance Communication Mechanism for Multicomputer Systems", 1996 IEEE, Proceedings of IPPS 1996, pp. 76–83.

* cited by examiner

Primary Examiner—Mark H. Rinehart
Assistant Examiner—Trisha Vu
(74) Attorney, Agent, or Firm—Blakely, Sokoloff, Taylor & Zafman LLP (57) ABSTRACT

A method and apparatus in which an arbiter links to a processor having a flexible architecture, and the processor connects to a device through a point to point bus.

10 Claims, 9 Drawing Sheets

APPARATUS AND A METHOD TO PROVIDE HIGHER BANDWIDTH OR PROCESSING POWER ON A BUS

FIELD OF THE INVENTION

This invention generally relates to changing the number of ports linked between a device and a processor. More particularly this invention relates to an apparatus and method capable of changing the number of ports linked between a device and a processor without changing the architecture in the processor.

BACKGROUND OF THE INVENTION

Figure 1:
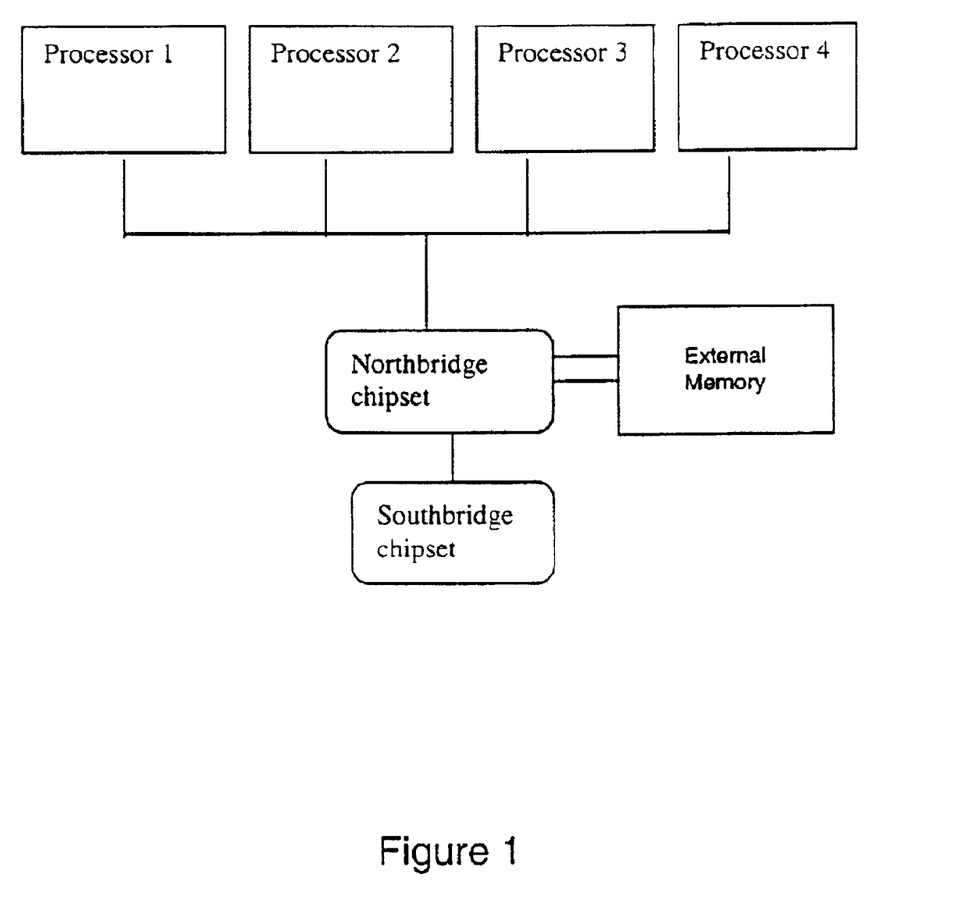
FIG. 1 illustrates a four processor (4P) architecture used in conjunction with a shared bus.

Joining several processors in parallel increases processing capacity. Typically, any number from two to eight processors may be joined in parallel. Generally, multiple parallel processors are joined together on a shared bus. FIG. 1 illustrates a four processor (4P) architecture used in conjunction with a shared bus. Four processors, Processor 1, Processor 2, Processor 3, and Processor 4, connect to a shared bus, which in turn connects to the Northbridge chipset. The Northbridge chipset further connects to the Southbridge chipset and external memory. For example, a Pentium™ processor may employ the shared bus architecture illustrated in FIG. 1. However, a point-to point architecture, typically, provides a higher bandwidth than does a shared bus architecture.

In a shared bus architecture, multiple devices all share the same bus and must follow an order and protocol to use the bus. In contrast, a point-to-point bus architecture provides an uninterrupted connection between two separate devices. Thus, in general, a point-to-point bus creates a higher bandwidth between two separate devices. A higher bandwidth can have the beneficial effect of yielding an increased performance from a single processor or group of processors. For example, if a 48-bit connection exists between two devices, then transactions occur between the two devices three times faster than if only a 16-bit connection exists between the two devices. However, a point-to-point bus architecture may have a disadvantage because the architecture provides an uninterrupted connection between two separate devices. Thus, if at any given time, light transfers of information occur between the two devices, then the excess bandwidth capacity is essentially wasted.

For example, if a customer is using his or her computer system to run both a workstation application and a server application, then the customer may not be achieving peak performance from the hardware in his computer system. In a server application a heavy exchange of information occurs between processors. Thus, the manufacturer may create a high bandwidth connection between each processor in the system. Yet, if for example a customer wants to use a computer system for an application, which involves a heavy exchange of information between each processor and a chipset, such as a workstation application, then the manufacturer creates a high bandwidth connection between each processor and the chip in the system. However, if the customer has a computer system which has a high bandwidth connection between the processor(s) and the chipset, but chooses to currently run a server application on this system, then the customer may suffer poor performance from the server application and waste the excess bandwidth between the chipset and processor(s).

Further, manufacturers may build different versions of a processor: to optimally service either a work station or a server; or to perform satisfactorily for most work station or server applications. Typically, a processor is hardwired to the other processors and components, such as chipsets, in the system. A manufacturer may create a high bandwidth connection between two processors or a processor and a chipset by dedicating a number of port establishing the connection between these two devices. The manufacturer creates the chip with an expectation that a hardwire connection to exist between the two devices. The manufacturer presets the processing component of the processor to know that these ports are dedicated between the two devices.

BRIEF DESCRIPTION OF THE DRAWINGS

The drawings refer to the invention in which.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

A person skilled in the art will appreciate that various deviations from the described embodiments of the invention are possible and that many modifications and improvements may be made within the scope and spirit thereof. For example, in several described embodiments specific clock speeds, specific number of data bits, specific number of layers, a specific number of components, etc. are used within this description to illustrate embodiments of the invention. However, a person skilled in the art will appreciate that embodiments of this invention specifically include various deviations from the specific number given in a particular embodiment described herein for illustrative purposes.

An arbiter may be used with a processor in a point-to-point architecture to allow a customer to change the number of ports linked between a processor and a device external to the processor. A point-to-point bus architecture provides an uninterrupted connection between two separate devices. Generally, a packet based protocol transfers information in a point-to-point bus architecture. The arbiter may alter the number of ports linked between the processor and the device exterior to the processor by changing one or more internal signal pathways in the processor without changing a physical component layout in the processor. In an embodiment, the manufacturer or the customer may change the number of ports linked between the two devices to increase the bandwidth between the devices. In an embodiment, the manufacturer or the customer may add additional processors linked to a device by changing the number of ports linked between a first processor and the device exterior to the first processor.

Figure 2:
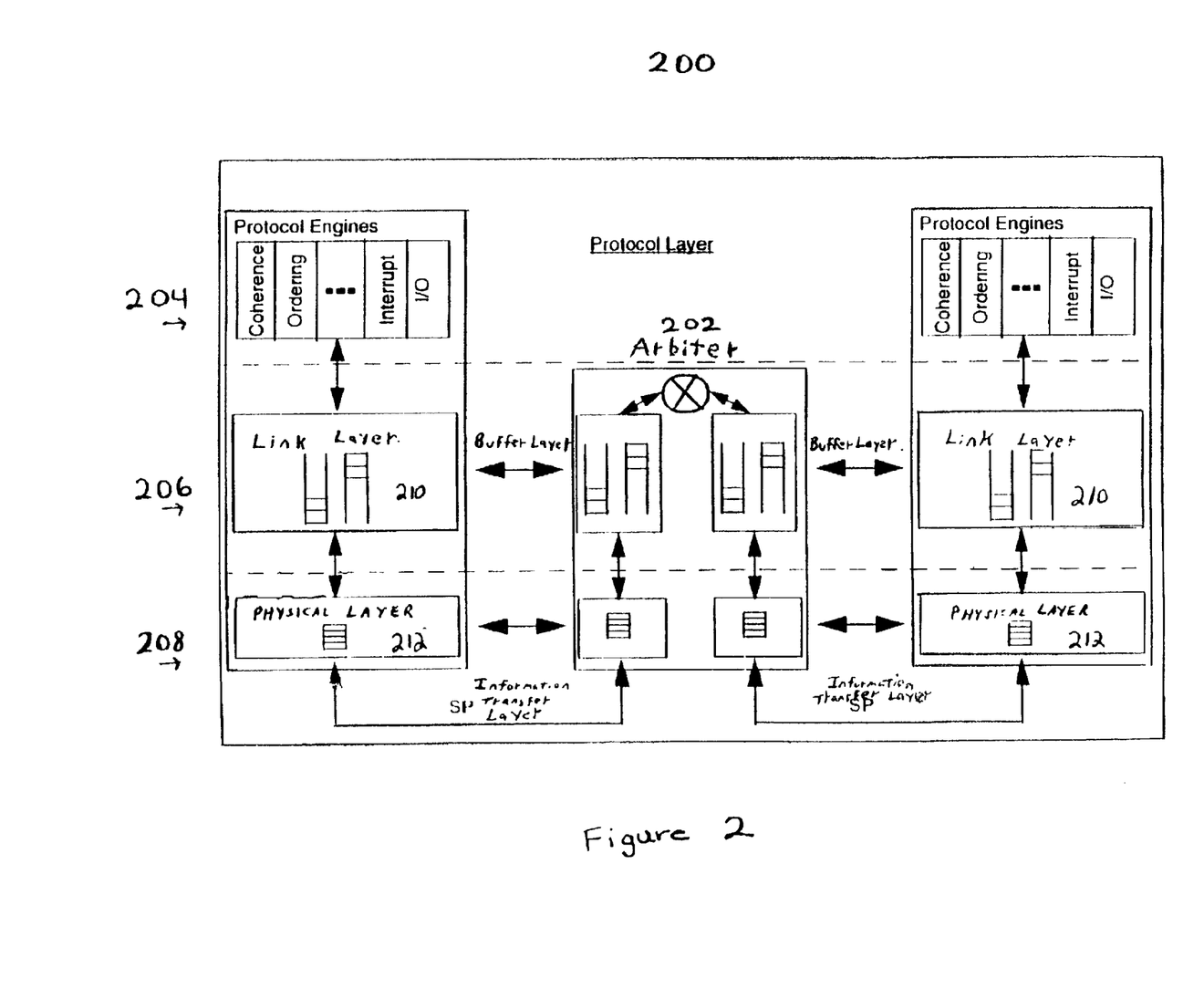
FIG. 2 illustrates an embodiment of a processor having an arbiter, a protocol layer, a buffer layer, and an information transfer layer.

FIG. 2 illustrates an embodiment of a processor 200 having an arbiter 202, a protocol layer 204, a buffer layer 206, and an information transfer layer 208. In one embodiment, the processor 200 has an arbiter 202 and three layers, the protocol layer 204, a buffer layer 206 such as one or more link layers 210, and an information transfer layer 208 such as one or more physical layers 212. The arbiter 202 changes the signal pathways within the physical layer 212 and link layer 210 without changing the physical component layout in the processor 200. The physical layer 212 carries out the actual physical transfer of information to and from other devices. The link layer 210 performs liaison functions between the higher functions of the protocol layer 204 and the physical layer 212. The protocol layer 204 processes requests, responses, and data transfers.

In an embodiment, the arbiter 202 may be internal or external to the processor 200. In an embodiment, a single arbiter 202 controls the signal pathways in all the layers of the processor 200. In an alternative embodiment, multiple arbiters 202 exist to control the signal pathways. The arbiter 202 may be a combination of hardware and software. The arbiter 202 may have several functions such as sending an enable/disable signal to one or more signal pathway switching devices and sending a signal to change various clocking speeds. The buffer layer 206 may have one or more inbound signal pathways. The buffer layer 206 may have one or more outbound signal pathways. The information transfer layer 208 may have one or more inbound signal pathways. The information transfer layer 208 may have one or more outbound signal pathways.

Figure 3:
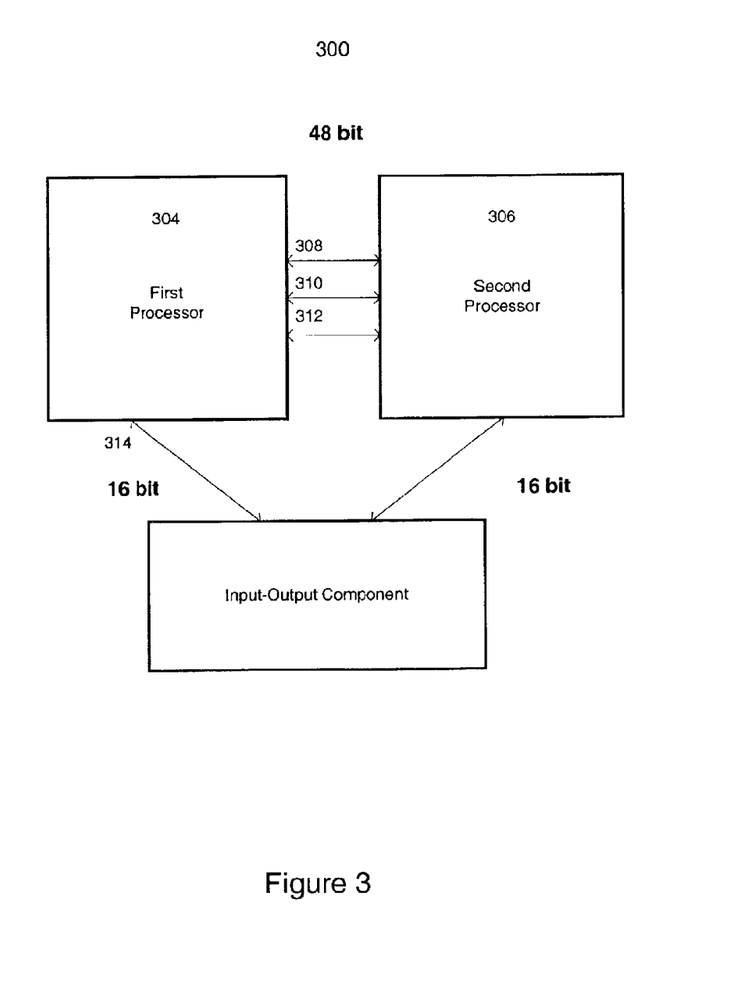
FIG. 3 illustrates a two processor point-to-point architecture having a 16-bit point-to-point connection between: 1) an input-output component and the first processor; as well as 2) the input-output component and the second processor.

FIG. 3 illustrates a two processor point-to-point architecture 300 having a 16-bit point-to-point connection between: 1) an input-output component 302 and the first processor 304; as well as 2) the input-output component 302 and the second processor 306. A first processor 304 having four 16-bit ports 308, 310, 312, 314 connected to the processor may have three 16-bit ports 308, 310, 312 connected to a second processor 306 and one 16-bit port connected 314 to the input-output component 302. In an embodiment, the input-output component maybe a bridge, a memory, a chipset or similar component. Thus, a 48-bit bandwidth connection exists between the first processor 304 and the second processor 306. Further, the first processor 304 and the second processor 306 have a 16-bit bandwidth connection to the input-output component 302. The arbiter can change the signal pathways in the first processor 304 such that the processor now has two 16-bit point-to-point (32-bit) connections to the second processor 306 and a 32-bit connection to the input-output component 302.

Figure 4:
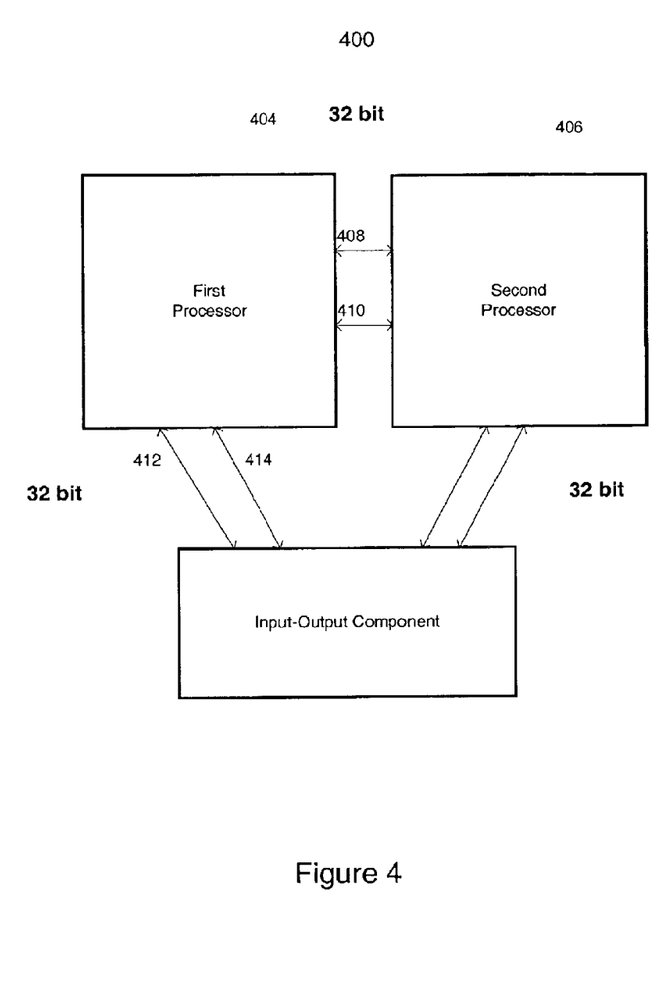
FIG. 4 illustrates a two processor point-to-point architecture having a 32-bit point-to-point connection between: 1) the input-output component and the first processor; as well as 2) the input-output component and the second processor.

FIG. 4 illustrates a two processor point-to-point architecture 400 having a 32-bit point-to-point connection between: 1) the input-output component 402 and the first processor 404; as well as 2) the input-output component 402 and the second processor 406. A first processor 404 having four 16-bit ports 408, 410, 412, 414 connected to the processor may have two 16-bit ports connected to a second processor 406 and two 16-bit ports connected to the input-output component 402 such as a chip set. Thus, a 32-bit bandwidth connection exists between the first processor 404 and the second processor 406. Further, the first processor 404 and the second processor 406 have a 32-bit bandwidth connection to the input-output component 402. In the 32-bit mode as compared to 16-bit mode, the bandwidth between the input-output component 402 and the first processor 404 as well as the input-output component 402 and the second processor 406 has effectively doubled. Bandwidth is the total amount of information that can be transferred within a given time period between two devices. In 16-bit mode, eight clock cycles must occur to transfer eight 16-bit packets (128 bits) of information between each processor and the input-output component. In 32-bit mode, four clock cycles must occur to transfer four 32-bit packets (128 bits) of information between each processor and the input-output component.

Figure 5:
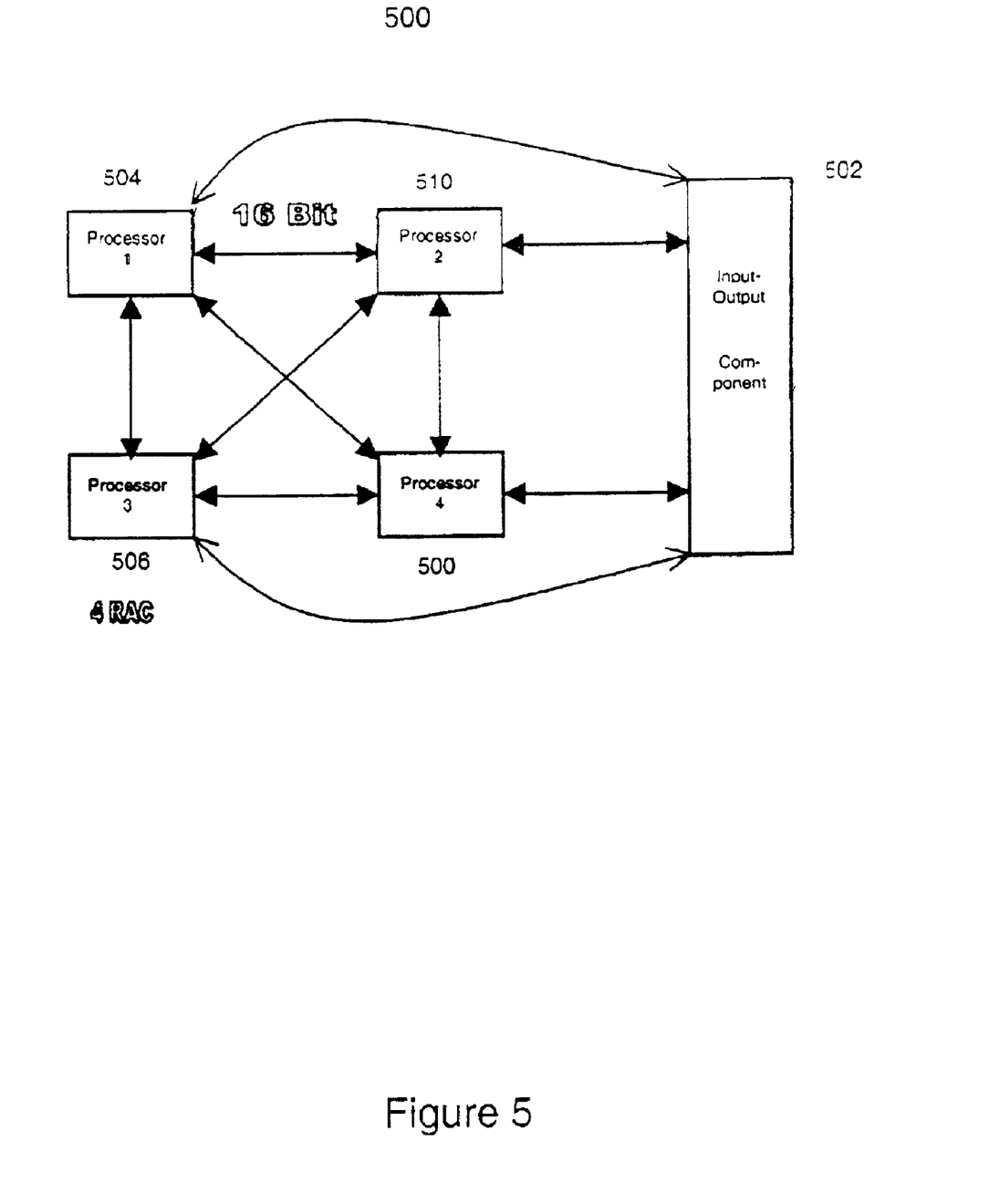
FIG. 5 illustrates a four processor point-to-point architecture having a 16-bit point-to-point connection between an input-output component and each of the four processors.

FIG. 5 illustrates an embodiment of a four processor point-to-point architecture 500 having a 16-bit point-to-point connection between an input-output component 502 and each of the four processors 504, 506, 508, 510. The four processors are processor 1 504, processor 2 506, processor 3 508, and processor 4 510. In an embodiment, each of the four processors 504, 506, 508, 510 employs an embodiment of the arbiter. The processors 504, 506, 508, 510 have a flexible architecture that coordinates with the arbiter to allow a variety of uses for these processors 504, 506, 508, 510. For example, the four processor architecture 500 may be substituted with the two processor architecture employing a 32-bit connection with the input-output component 502. Thus, the processing power of this arrangement has effectively doubled because four processors will process the data coming from the input-output component 502. Thus, an embodiment of the arbiter allows the same input-output component 502 to work with either a two processor architecture, a four processor architecture 500 or other similar multiple processor architecture.

A programmable knob setting in a configuration register directs the arbiter to establish the customer's current desired configuration such as a 16-bit, 32-bit, or 48-bit point-to-point connection between the processor and a device exterior to the processor. In an embodiment, the device exterior to the processor may be another processor, an input-output device, a bridge or other similar device. In an embodiment, the manufacturer or the customer may program the knob setting to establish the bandwidth connections between the processor and devices exterior to the processor. Based on the knob setting of the configuration register, the arbiter may enable and disable signal pathways within the information transfer layer and buffer layer. In an embodiment, the arbiter may change these signal pathways to increase or decrease the number of processor ports, and thus, the effective bandwidth, between a processor and another device. In an embodiment, the arbiter may change these signal pathways to increase or decrease the number of processor ports, and thus the number of processors, connected to the input-output device.

Typically, in a server, a large exchange of data occurs between a first processor and a second processor. Thus, having a 48-bit point-to-point connection between these two devices greatly decreases the time required to complete each transaction between the devices. Typically, in a work station, a large exchange of data occurs between a each processor and the input-output component. Thus, having a 32-bit or 48-bit point-to-point connection between these devices greatly decreases the time required to complete each transaction between the devices.

Figure 6:
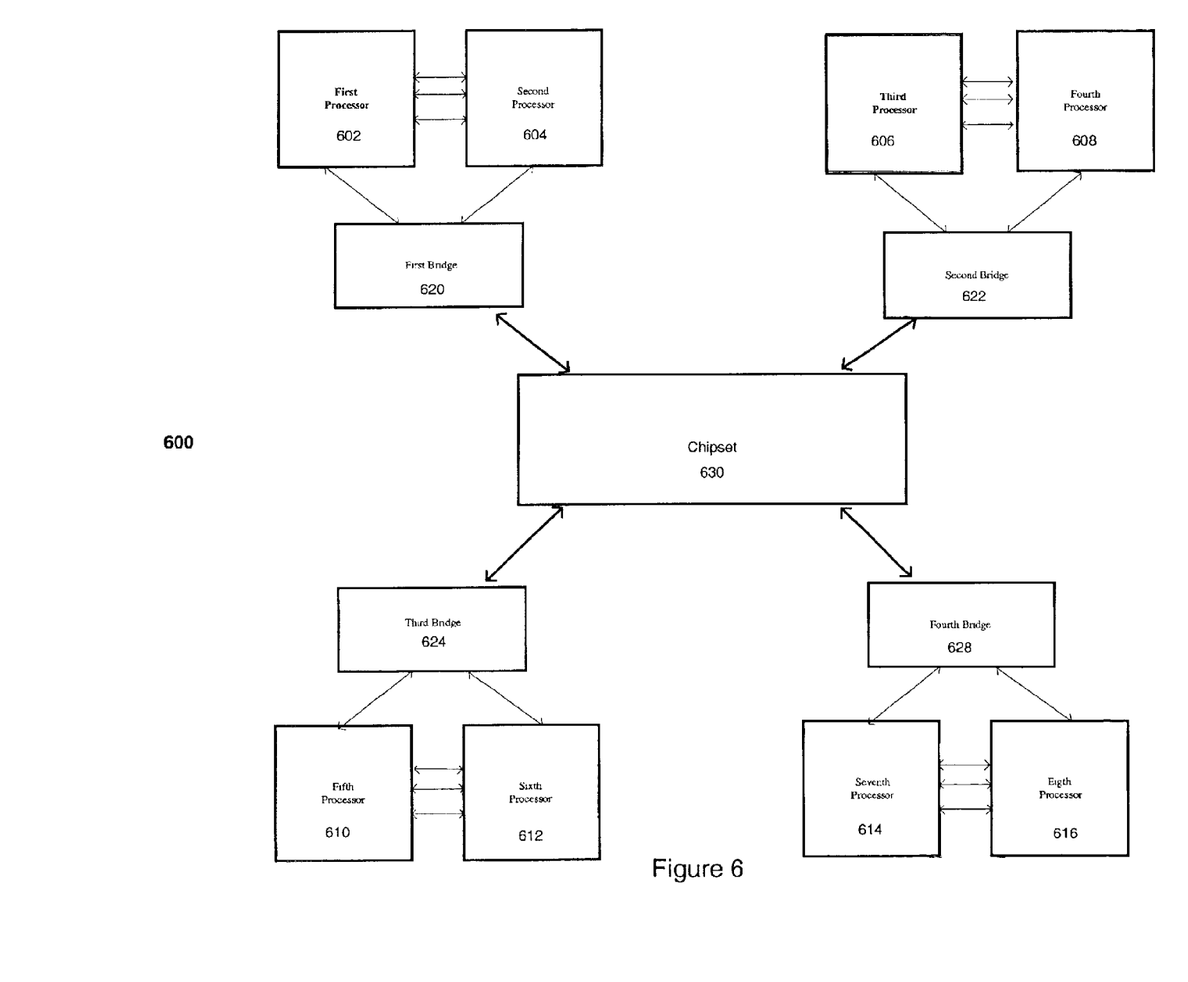
FIG. 6 illustrates an embodiment of an eight processor point-to-point architecture comprised of four pairs of processors linked to a corresponding bridge and each bridge connected to a chipset.

FIG. 6 illustrates an embodiment of an eight processor (8P) point-to-point architecture 600 comprised of four pairs of processors, 602, 604, 606, 608, 610,612, 614 and 616, linked to a corresponding bridge, 620, 622, 624, 628, and each bridge, 620, 622, 624, 628, connected to a chipset 630. A first processor 602 and a second processor 604 each have a 16-bit point to point connection with a first bridge 620. The first bridge 620 has a connection, such as a 32-bit connection, with the chipset 630. Similarly, a third processor 606 and a fourth processor 608 each have a 16-bit point to point connection with a second bridge 622. The second bridge 622 has a connection, such as a 32-bit connection, with the chipset 630. In a similar fashion, the fifth processor 610 through eighth processor 612 eventually link with the chipset 630. In an embodiment, the arbiter may allow the signal paths internal to each processor 602, 604, 606, 608, 610,612, 614 and 616, to be changed by a programmable setting. This allows a manufacturer to fabricate a single version of a processor with a generic but flexible architecture within the processor to service multiple processor platforms. Thus, in an embodiment, an arbiter linked to a processor having a single flexible architecture may be employed to service, a 2P architecture, 4P architecture, 8P architecture or other multiple processor architecture, as well as service a server application and a workstation application.

In an embodiment, the ability of the arbiter to change the allocation of internal signal paths allows a manufacturer to design and fabricate fewer versions of the same chip to service customers needs. In an embodiment, the architecture of the processor is the arrangement and component makeup of the various elements within the processor. In an embodiment, the components and elements contained within the protocol layer, the information layer and the buffer layer makeup the architecture of the processor. Those ordinarily skilled in the art will recognize the specific components illustrated in the following embodiments may be deviated from and still be within the spirit of this invention.

Figure 7:
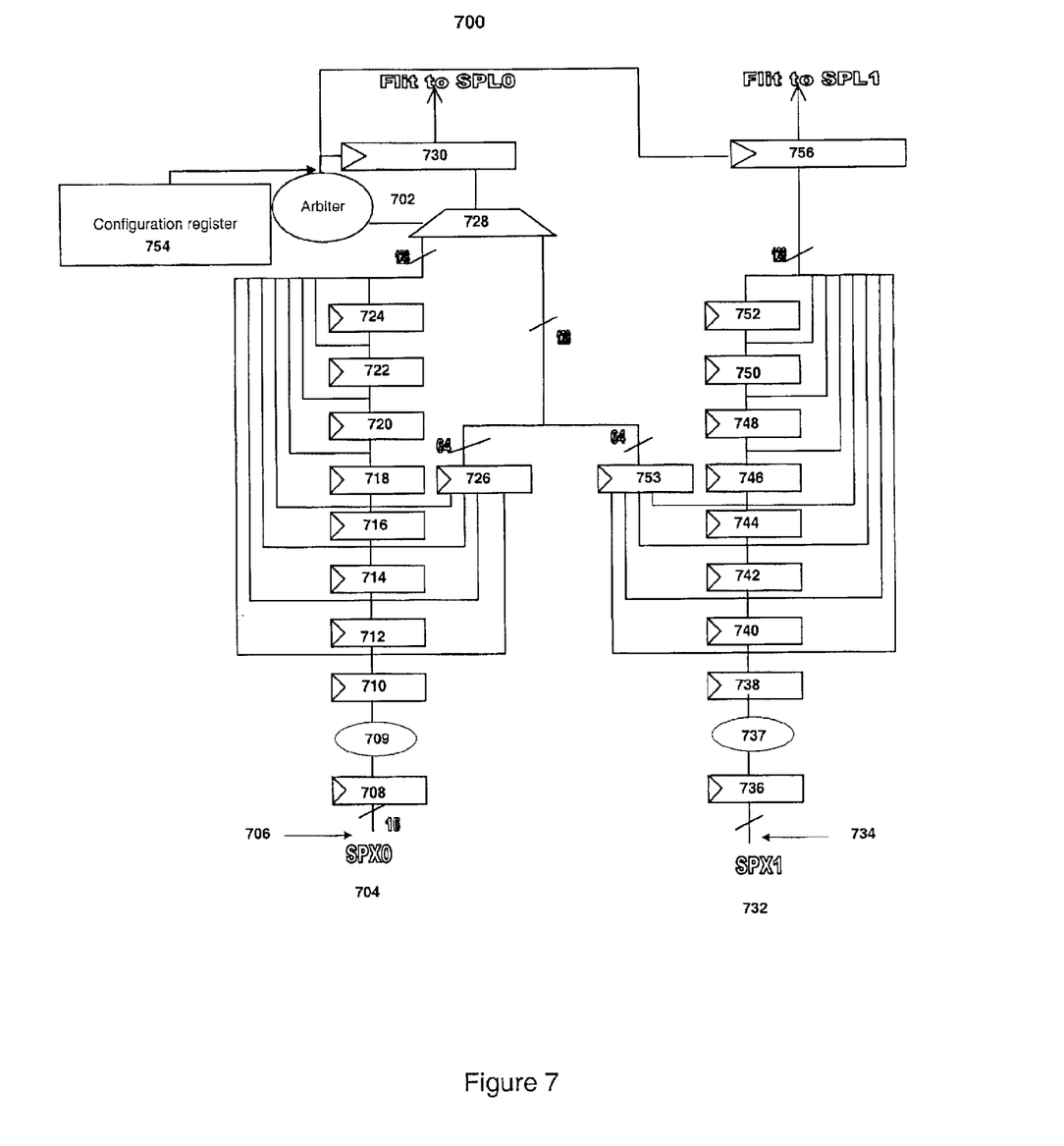
FIG. 7 illustrates an embodiment of the arbiter controlling the inbound signal pathways in an embodiment of the information transfer layer.

FIG. 7 illustrates an embodiment of the arbiter 702 controlling the inbound signal pathways in an embodiment of the information transfer layer 700. The first physical layer (SPXO) 704 has a first port 706; nine 16-bit registers, a first register 708, a second register 710, a third register 712, a fourth register 714, a fifth register 716, a sixth register 718, a seventh register 720, an eighth register 722, and a ninth register 724; first 64-bit register 726; a signal pathway switching device 728 such as a multiplexer; an embodiment of the arbiter 702; a first time delay 709, and a first flip flop 730. The second physical layer (SPX1) 732 has a second port 734; nine 16-bit registers, a tenth register 736, an eleventh register 738, a twelfth register 740, a thirteenth register 742, a fourteenth register 744, a fifteenth register 746, a sixteenth register 748, a seventeen register 750, and an eighteenth register 752; a second 64-bit register 753; and a second time delay 737, and a second flip flop 756. A multiplexer is a device that merges several low-speed transmissions into one high-speed transmission and vice versa. The configuration register 754 informs the arbiter 702 whether a particular component exterior to the processor should be a 16-bit, 32-bit or 48-bit-point-to-point connection.

If the configuration register 754 is programmed for a 16-bit point-to-point connection to the input-output component, then the arbiter 702 directs each physical layer to act independently of the other physical layers. In an embodiment of a four processor architecture for example, the first port 706 connects to a second processor and the second port 734 links up to an input-output component. The first register 708 receives an inbound 16-bit packet of information through the first port 706. This 16-bit packet of information is sent from the first register 708 through a first time delay 709 to be stored in the second register 710. The first register 708 receives another inbound 16-bit packet of information through the first port 706. The first register 708 sends this second 16-bit packet of information to be stored in the third register 712. The first physical layer 704 repeats this process until the second register 710 through the ninth register 724 are each storing 16-bit packets of information. The first signal pathway switching device 728 senses that these eight 16-bit (or 128-bits) of information are ready to be transferred to the first link layer through the first flip flop 730. Upon the next clock cycle the 128-bits of information are transferred to the first link layer through the first flip flop 730. In a similar manner but using the components of second physical layer 732, the second physical layer 732 transfers 128-bits to the second link layer. However, the 128-bits of information that are transferred to the first link layer are unrelated to the 128-bits of information that are transferred to the second link layer. Thus, in our example the first 128-bits of information come through the first port 706 from a second processor. Similarly, the second 128-bits of information come through the second port 734 from the input-output component. The arbiter 702 enables the 128-bit path in the first signal pathway switching device 728. The arbiter 702 disables the dual 64-bit path in the first signal pathway switching device 728. The arbiter 702 enables the first flip flop 730 and the second flip flop 756.

If the configuration register 754 is programmed for a 32-bit point-to-point connection, then the arbiter 702 gangs two physical layers to act together. The arbiter 702 disables the 128-bit path in the first signal pathway switching device 728. The arbiter 702 enables the dual 64-bit path in the first signal pathway switching device 728. The arbiter 702 enables the first flip flop 730 but disables the second flip flop 756. The arbiter 702 increases the clocking speed for the first register 708 through the eighteenth register 752 by a factor of two. The first physical layer 704 receives four 16-bit packets of information and stores the packets of information in the second register 710 through the fifth register 716. The second physical layer 732 receives four 16-bit packets of information and stores the packets of information in the eleventh register 738 through the fourteenth register 744. The first signal pathway switching device 728 senses that the first 64-bit register contains four 16-bit packets of information from the second register 710 through the fifth register 716. The first signal pathway switching device 728 senses that the second 64-bit register contains four 16-bit packets of information from the eleventh register 738 through the fourteenth register 744. Upon the next clock cycle, the 64-bits of information from the first 64-bit register and the 64-bits of information from the second 64-bit register are transferred up to the first signal pathway switching device 728 through the dual 64-bit path. The first signal pathway switching device 728 transfers the eight related 16-bit packets of information to the first link layer. Both the device exterior to the processor and the processor transfer the eight related 16-bit packets of information as if a 32-bit point-to-point connection exists between the processor and the device. The second link layer receives no signal because the second flip flop 756 is disabled. In a similar manner, the arbiter may gang three physical layers together to create a 48-bit point-to-point connection between the processor and the device.

Figure 8:
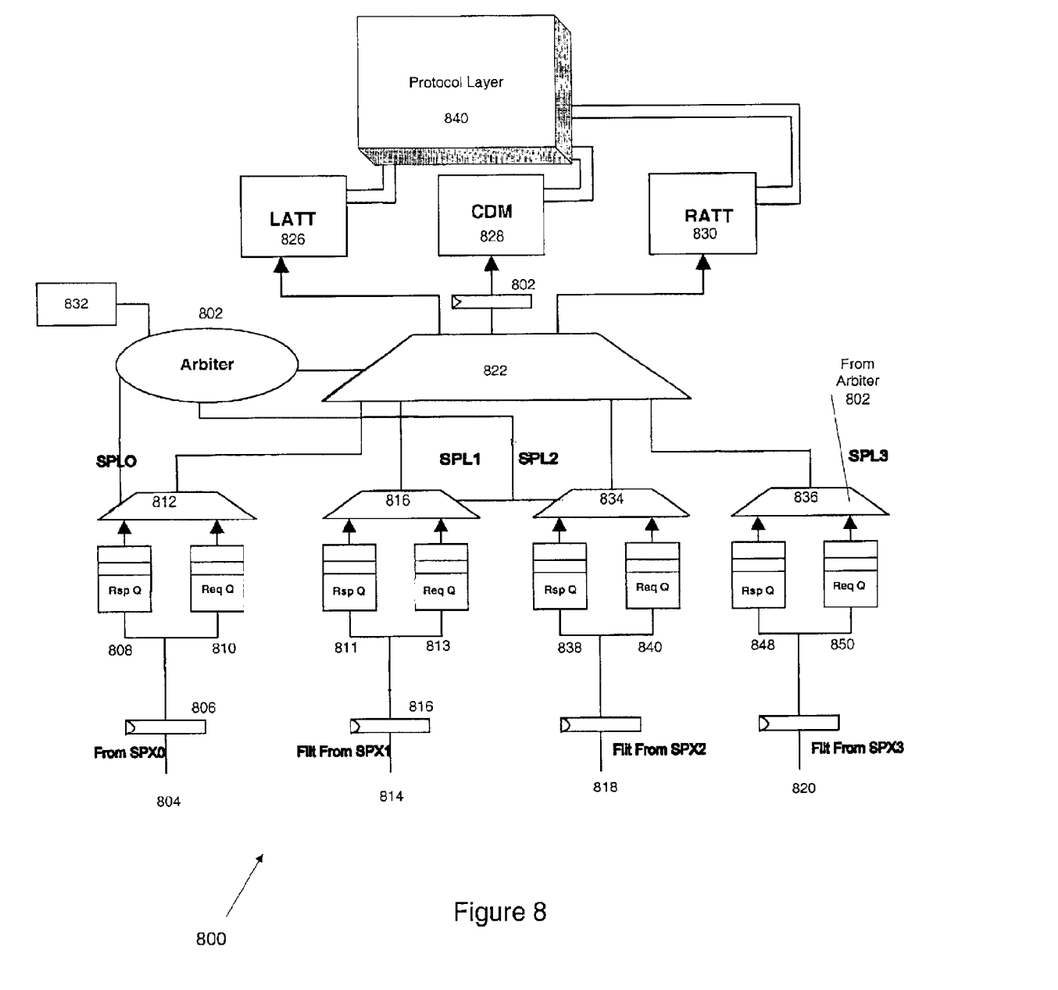
FIG. 8 illustrates an embodiment of the arbiter controlling the inbound signal pathways in an embodiment of the buffer layer.

FIG. 8 illustrates an embodiment of the arbiter 802 controlling the inbound signal pathways in an embodiment of the buffer layer 800. The inbound signal pathway of the first link layer 804 has a first 128-bit register 806, a first response queue 808, a first request queue 810, and a first signal pathway switching device 812. The inbound signal pathway of the second link layer 814 has a second 128-bit register 816, a second response queue 811, a second request queue 813, and a second signal pathway switching device 816. The component makeup of the third link layer 818 and fourth link layer 820 are similar to the first link layer 804. The first link layer 804 through the fourth link layer 820 feed into a fifth signal pathway switching device 822, an embodiment of an arbiter 802, a fifth 128-bit register 824, a local address transaction tracker buffer (LATT) 826, a central data management buffer (CDM) 828, and a remote address transaction tracker buffer (RATT) 830.

In an embodiment of the inbound buffer layer 800, if the configuration register 832 is programmed for a 32-bit point-to-point connection, then the arbiter 802 effectively gangs two link layers together. The first link layer 804 receives the eight related 16-bit packets (128-bit) of information at twice the clock speed from the communication switching device in the first physical layer. The first link layer 804 stores the 128-bit packet of information in the first register 806. The 128-bit packet of information is routed appropriately to either the first response queue 808 or the first request queue 810. The arbiter 802 sends an enablement signal to the first signal pathway switching device 812, third signal pathway switching device 834, and fifth signal pathway switching device 822. The arbiter 802 also sends a disable signal to the second signal pathway switching device 816 and fourth signal pathway switching device 836. The arbiter 802 directs the fifth signal pathway switching device 822 to request data only from the first signal pathway switching device 812 and the third signal pathway switching device 834. In 32-bit mode, the second signal pathway switching device 816 and fourth signal pathway switching device 836 receive no signal from the physical layer because the arbiter 802 disabled the second flip flop and fourth flip flop in the physical layer.

The 128-bit packets of information are transferred to the fifth signal pathway switching device 822 through the first signal pathway switching device 812 and then the third signal pathway switching device 834 in a cyclic sequential manner. In a repeating cycle, the fifth signal pathway switching device 822 requests the contents of the first response queue 808, then the first request queue 810, then the third response queue 838, then the third request queue 840, and then repeats this sequence. Every packet of information may be either a request for a command and/or data or a response to a command or data. In an embodiment, once a packet is written into a response queue or request queue, then the information is transferred from these queues at core clock frequency. The packets of information are sent from the fifth signal pathway switching device 822 to one of the following three components. The central data management buffer (CDM) 828 stores data to be consumed by the protocol layer 840. The remote address transaction tracker buffer (RATT) 830 stores commands from a remote device such as a request from a remote processor. The CDM 828 stores corresponding data, if any, associated with that command. Similarly, the local address transaction tracker buffer (LATT) 826 stores local commands and responses made by the processor core. The corresponding data, if any, associated with that command is stored in the CDM 828.

If the configuration register 832 is programmed for a 16-bit point-to-point connection, then each inbound link layer 804, 814, 818, 820 acts independently. The arbiter 802 directs the fifth signal pathway switching device 822 to request information out of the eight possible sources, the corresponding request queue 810, 813, 840, 850 or the corresponding response queue 808, 811, 838, 848 in each link layer 804, 814, 818, 820, in a cyclic sequential manner. If a particular queue is empty, then the fifth signal pathway switching device 822 automatically pulls packets out of the next queue without any penalty. In an embodiment, the packets from the four physical layers are written into the appropriate queue at 100 megahertz, if the configuration register is programmed for a 16-bit connection. The packets are written into the queues at 200 Megahertz if the configuration register 832 is programmed for a 32-bit connection. If the configuration register is configured for a 48-bit connection, then the arbiter 802 gangs three link layers together. Once the fifth signal pathway switching device 822 picks a packet of information from one of the eight possible sources, then the packet is sent to the to the protocol layer 840.

The inbound link layer sends responses and requests to protocol layer 840. The protocol layer 840 alternates choosing a command from the LATT 826 or RATT 830 accompanied by data from the CDM 828. In one embodiment, this physical information may be sent to a CPU. The information goes to the CPU to be processed and sent to the outbound bound link layer. The protocol layer 840 typically is the processing component. The protocol layer 840 typically resolves requests from other local processors and sends requests out through the physical layer. The protocol layer 840 may be responsible for functions such as ordering, conflict detection, and coherence. The protocol layer 840 may forward requests for data to the local memory controller if the request is made to local memory. The protocol layer 840 may send snoop requests to the remote nodes and other local processors. The protocol layer 840 also processes requests made through the link layer, which may come from a remote processor or an input-output component.

Figure 9:
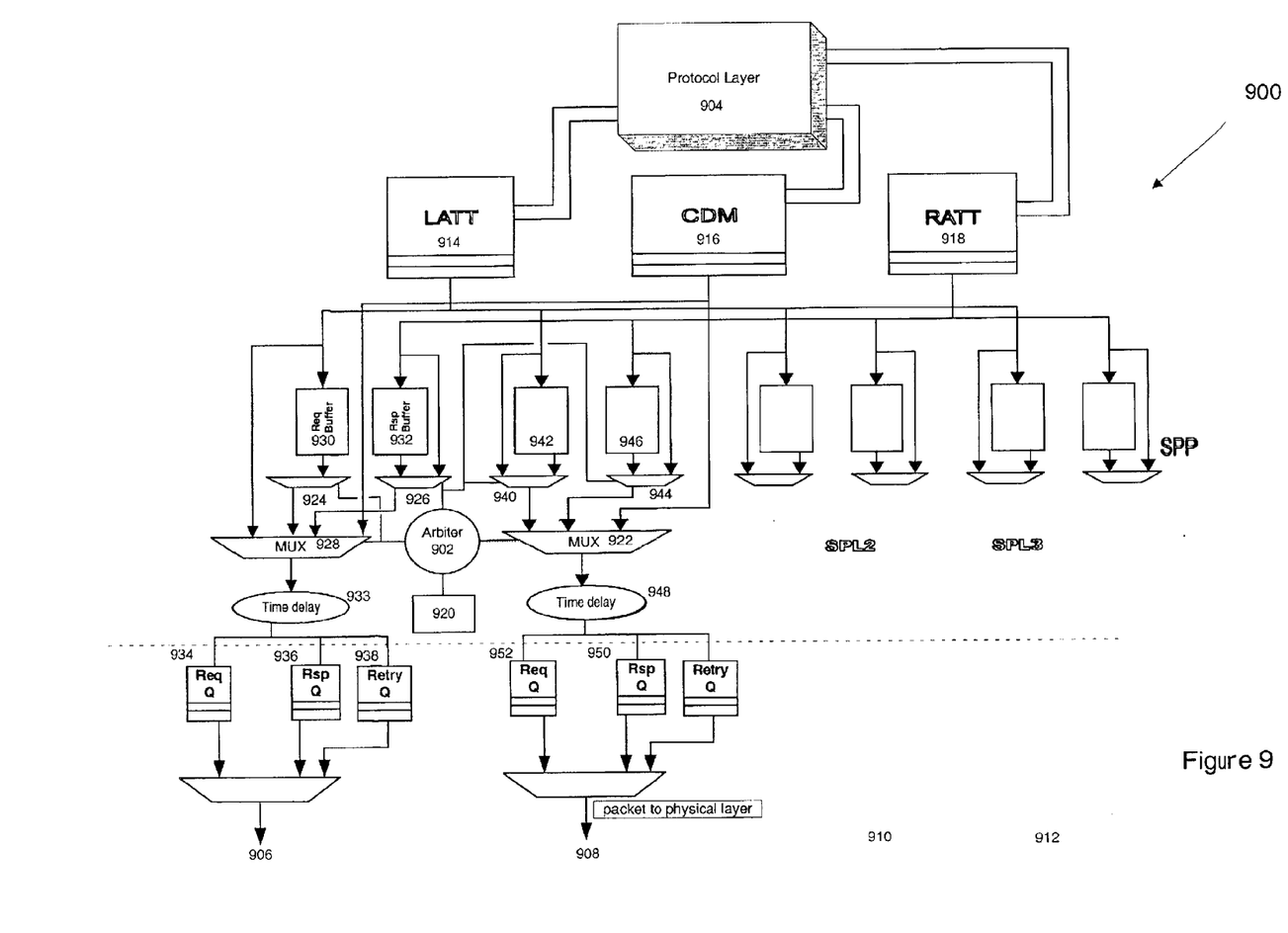
FIG. 9 illustrates an embodiment of the arbiter controlling the outbound signal pathways in an embodiment of the buffer layer.

FIG. 9 illustrates an embodiment of the arbiter 902 controlling the outbound signal pathways in an embodiment of the buffer layer 900. The protocol layer 904 sends the processed data and commands to each outbound link layer 906, 908, 910, 912. The protocol layer 904 delivers commands generated from itself to the LATT 914 and data, if any, corresponding to that command to the CDM 916. The protocol layer 904 delivers responses to commands from remote devices to the RATT 918 and data, if any, corresponding to that command to the CDM 916. If the configuration register 920 is programmed for a 32-bit point-to-point connection, then the arbiter 902 effectively enables two of the four outbound link layers. The following happens in tracing the signal path in the first outbound link layer 906 and the second outbound link layer 908. The arbiter 902 directs the second signal pathway switching device 922 and the fourth signal pathway switching device (not shown) to be disabled. The arbiter 902 directs the fifth signal pathway switching device 928 to request data through the first signal pathway switching device 924 and third signal pathway switching device 926 from their respective request buffer 930 or response buffer 932. The fifth signal pathway switching device 928 alternates, in a repeating cycle, requests for bits from the request buffer 930 and the response buffer 932. The fifth signal pathway switching device 928 also receives any data, if any, corresponding to those commands from the CDM 916. The fifth signal pathway switching device 928 then routes the 128-bit data packet through a first time delay 933 to either the outbound response queue 936 or outbound request queue 934 located in the outbound physical layer.

One or more retry queues 938 exist in the outbound link layer. The retry queue 938 stores a duplication of the information to be transferred in case an error occurs in the transfer of the information. The retry queue 938 exists primarily in case there may be an error in the link. The retry queue 938 erases the duplicated information stored in a retry queue 938 upon receiving a confirmation of an error free transfer of information.

If the configuration register 920 is programmed for a 16-bit point-to-point connection, then the arbiter 902 directs each outbound link layer 906, 908, 910, 912 to act independently. The arbiter 902 sends a signal to enable all of the outbound link layer communication switching devices and set the clock speed to the default clock speed. The information is routed from the LATT 914, RATT 918, and CDM 916 through its own respective outbound link layer to the corresponding outbound physical layer. For example, the arbiter 902 directs the second signal pathway switching device 922 to request data through the sixth signal pathway switching device 940 from the second request queue 942 and then request data through the seventh signal pathway switching device 944 from the second response queue 946. The second signal pathway switching device 922 alternates, in a repeating cycle, requests for bits from the second response queue 942 and the second request queue 946. The second signal pathway switching device 922 also receives any data, if any, corresponding to those commands from the CDM 916. The second signal pathway switching device 922 then routes the 128-bit data packet through a second time delay 948 to either the second outbound response queue 950 or second outbound request queue 952 located in the outbound physical layer.

Figure 10:
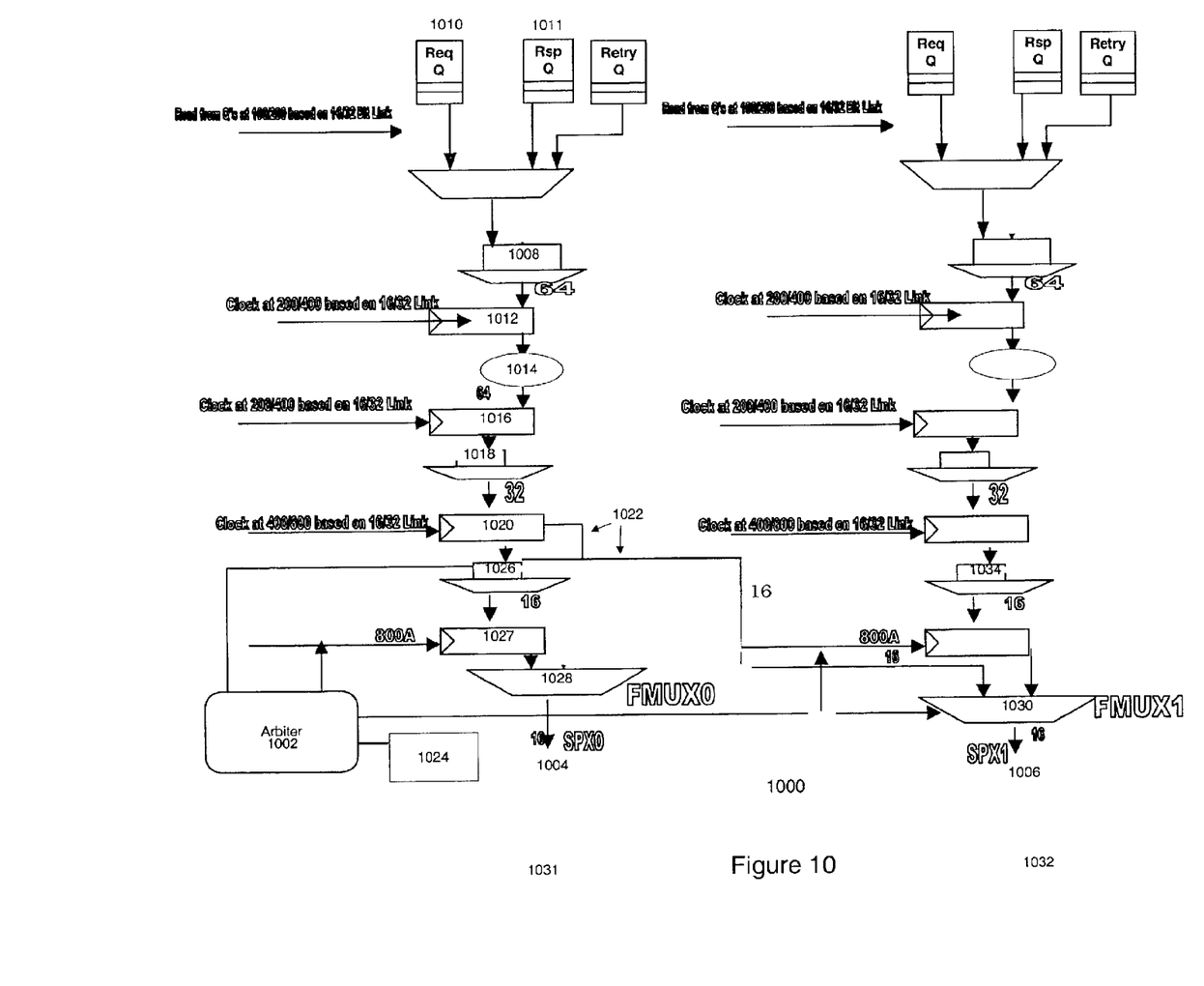
FIG. 10 illustrates an embodiment of the arbiter controlling the signal pathways in an outbound information transfer layer.

FIG. 10 illustrates an embodiment of the arbiter 1002 controlling the signal pathways in an outbound information transfer layer 1000. In an embodiment, the information transfer layer comprises one or more physical layers. The physical layer carries out the actual physical transfer of information to devices external to the processor through ports, such as a first port 1004 and a second port 1006. Typically, one 16-bit port exists on each physical layer such as the first port 1004. The processor transfers information between itself and a device exterior to the processor through these ports. The information signal contains information such as a request, response, or data.

In an embodiment of a two processor architecture, for example, three ports hook up to the second processor in the system, and the fourth port hooks up an input-output component such as a chip set. A first signal pathway switching device 1008 such a multiplexer receives a 128-bit packet of information from the link layer. The first signal pathway switching device 1008 reads the 128-bit packet of information from either the response queue 1011 or the request queue 1010 at a clock speed of 100 megahertz for example. The signal output of the first signal pathway switching device 1008 is two 64-bit packets of information, a first 64-bit packet and a second 64-bit packet which are stored in the first register 1012. After a time delay 1014, the second signal pathway switching device 1018 reads the first 64-bit packet through the second register 1016 at twice the clock speed, 200 megahertz, of the 128-bit packet of information. The signal output of the second signal pathway switching device 1018 is two 32-bit packets of information, a first 32-bit packet and a second 32-bit packet which are stored in the third register 1020. The clock speed of 32-bit packet of information in the third register is again doubled to 400 megahertz.

The arbiter 1002 now directs the 32-bit packet of information to take a 32-bit bypass path 1022 or a 16-bit information transfer path in the corresponding signal pathway switching devices 1026, 1034. The configuration register 1024 informs the arbiter 1002 whether the component exterior to the processor should be a 16-bit, 32-bit or 48-bit-point-to-point connection. In one embodiment, for example, if a 16-bit point-to-point connection exists between the processor and the input-output component, then arbiter 1002 directs each physical layer to act independently of the other physical layers. A fourth signal pathway switching device 1026 reads the 32-bit packet of information at 400 megahertz from the third register 1020 and outputs two 16-bit packets of information. A fifth signal pathway switching device 1028 reads the 16-bit packet of information at 400 megahertz from the forth register 1027 and outputs the 16-bit packet of information to the first port 1004. The arbiter 1002 sends a signal to the sixth signal pathway switching device 1030 in the second outbound physical layer 1032. The signal enables the 16-bit path in the fifth signal pathway switching device 1028. The arbiter 1002 disables the 32-bit bypass path 1022 from the fourth signal pathway switching device 1026. The arbiter 1002 also sends a signal to the second physical layer 1032, the sixth signal pathway switching device 1030, to enable the 16-bit path in the sixth signal pathway switching device 1030 and disable/ignore the 32-bit bypass path 1022 coming from the third register 1020. Thus, the output from first port 1004 and the second port 1006 are unrelated 16-bit packets of information.

If in one embodiment for example, a 32-bit point-to-point connection exist between the processor and the input-output component, then the arbiter 1002 gangs the output of the first port 1004 and the output of the second port 1006. The arbiter 1002 sends a signal to the sixth signal pathway switching device 1030. The arbiter's signal disables the 16-bit path in the sixth signal pathway switching device 1030 and enables the 32-bit bypass path 1022 coming from the third register 1020. The arbiter 1002 also sends a signal to the first physical layer 1031, the fourth signal pathway switching device 1026, to enable the 32-bit bypass path 1022. Thus, the output from first port 1004 and the second port 1006 are related 16-bit packets of information. In other words, the output from first port 1004 and the second port 1006 is a 32-bit packet of information. In order to keep the same transfer speeds, the arbiter 1002 also sends a signal to double the clocking speed that occurs in the registers. For example, the 32-bit packet of information in the third register 1020 is now clocked at 800 megahertz. 800 megahertz is twice the clock speed of when the 16-bit information transfer was occurring. In a similar manner, the arbiter 1002 can gang three ports together (not shown) to create a 48-bit connection in the outbound path.

In alternative embodiment, if three physical layers are linked to, for example, a second processor, then optionally the arbiter can be programmed to route the three related 16-bit packets destined for the second processor through the respective components of each link and physical layer. Thus, the first 16-bit packet travels through the components of the first physical layer and first link layer. The second 16-bit packet travels through the components of the second physical and second link layer. The third 16-bit packet travels through the components of the third physical layer and second link layer. The arbiter changes the addressing header in the three 16-bit packets to convey to the second processor that these three 16-bit packets are related.

The invention is subject to various modifications and alternative forms. Specific embodiments thereof have been shown only by way of example. The connections between the processor and the devices may be, for example, 8-bit to 64-bit or more. The clock speeds may be, for example, one megahertz to one gigahertz or more. The registers may be 1-bit to 128-bits or more. Further, most functions performed by the electronic hardware components may be duplicated by software emulation. Similarly, the functionality of each layer, the protocol layer, the buffer layer, and the information transfer layer may be combined, for example, on a single layer or transported to another component. The invention should be understood to not be limited to the particular forms disclosed, but on the contrary, the intention is to cover all modifications, equivalents, and alternatives falling within the spirit and scope of the invention as defined by the appended claims.

What is claimed is:

1. A method, comprising:

manufacturing a processor having a flexible architecture to service a multiple processor platform as well as a different application platform, wherein the processor contains a plurality of N-bit registers, wherein N-bit is any number, an XN-bit register, wherein X is a whole number greater than one and acts as a multiplier on the value of N, a multiplexer connected to each of the N-bit registers and the XN-bit register, and an arbiter connected to the mulitplexer to direct the multiplexer to route signals from the N-bit registers or a signal from the XN-bit register depending upon the platform to be serviced.

2. The method of claim 1, further comprising:

manufacturing the processor to communicate with a device through a point to point bus.

3. The method of claim 1, further comprising:

manufacturing the arbiter to alter one or more signal pathways that a signal may travel within the processor, the arbiter can alter the signal pathways without physically changing the flexible architecture inside the processor.

4. An apparatus, comprising:

an arbiter linked to a first processor having a flexible architecture with a first port and a second port, wherein the first processor contains a multiplexer, a first bit register connected in a signal path of the first port and a second bit register connected in a signal path of the second port;

a point to point bus; and a device, the first port connected to the device through the point to point bus, wherein the arbiter directs the multiplexer whether to route signals from the first bit register as well as from the second bit register.

5. The apparatus of claim 4, wherein the arbiter is internal to the first processor.

6. The apparatus of claim 4, wherein the arbiter is external to the first processor.

7. The apparatus of claim 4, wherein the arbiter comprises a component to change a number of ports linked between the first processor and the device without changing the flexible architecture within the processor.

8. The apparatus of claim 4, wherein the device is selected from the group consisting of an input-output component, a bridge, a chipset, a memory, or a second processor.

9. The apparatus of claim 4, wherein the processor comprises:

a protocol layer;

an information transfer layer to electronically transfer information on a physical medium between the protocol layer and the device; and a buffer layer to buffer an electronic transfer of information between the protocol layer and the information transfer layer.

10. The apparatus of claim 4, wherein the arbiter comprises a first component and a second component, the first component to determine a bandwidth between the device and the processor, the second component to provide a control signal to one or more signal pathway switching devices, the control signal to be based upon the bandwidth determination of the first component.

* * * * *